XR 2,734,131 CROSS REFERENCE SEARCH ROOM

Feb. 7, 1956 H. MAGNUSKI 2,734,131

COMMUNICATION SYSTEM WITH CARRIER STRENGTH CONTROL

Filed Dec. 4, 1952 2 Sheets-Sheet 1

INVENTOR.
Henry Magnuski

BY Norman L. Mueller

Atty.

COMMUNICATION SYSTEM WITH CARRIER STRENGTH CONTROL

Filed Dec. 4, 1952 2 Sheets-Sheet 2

INVENTOR.
Henry Magnuski
BY Foorman L. Mueller
Atty.

2,734,131
Patented Feb. 7, 1956

2,734,131

COMMUNICATION SYSTEM WITH CARRIER STRENGTH CONTROL

Henry Magnuski, Chicago, Ill., assignor to Motorola, Inc., Chicago, Ill., a corporation of Illinois Application December 4, 1952, Serial No. 323,967
10 Claims. (Cl. 250—15)

Figure 1:
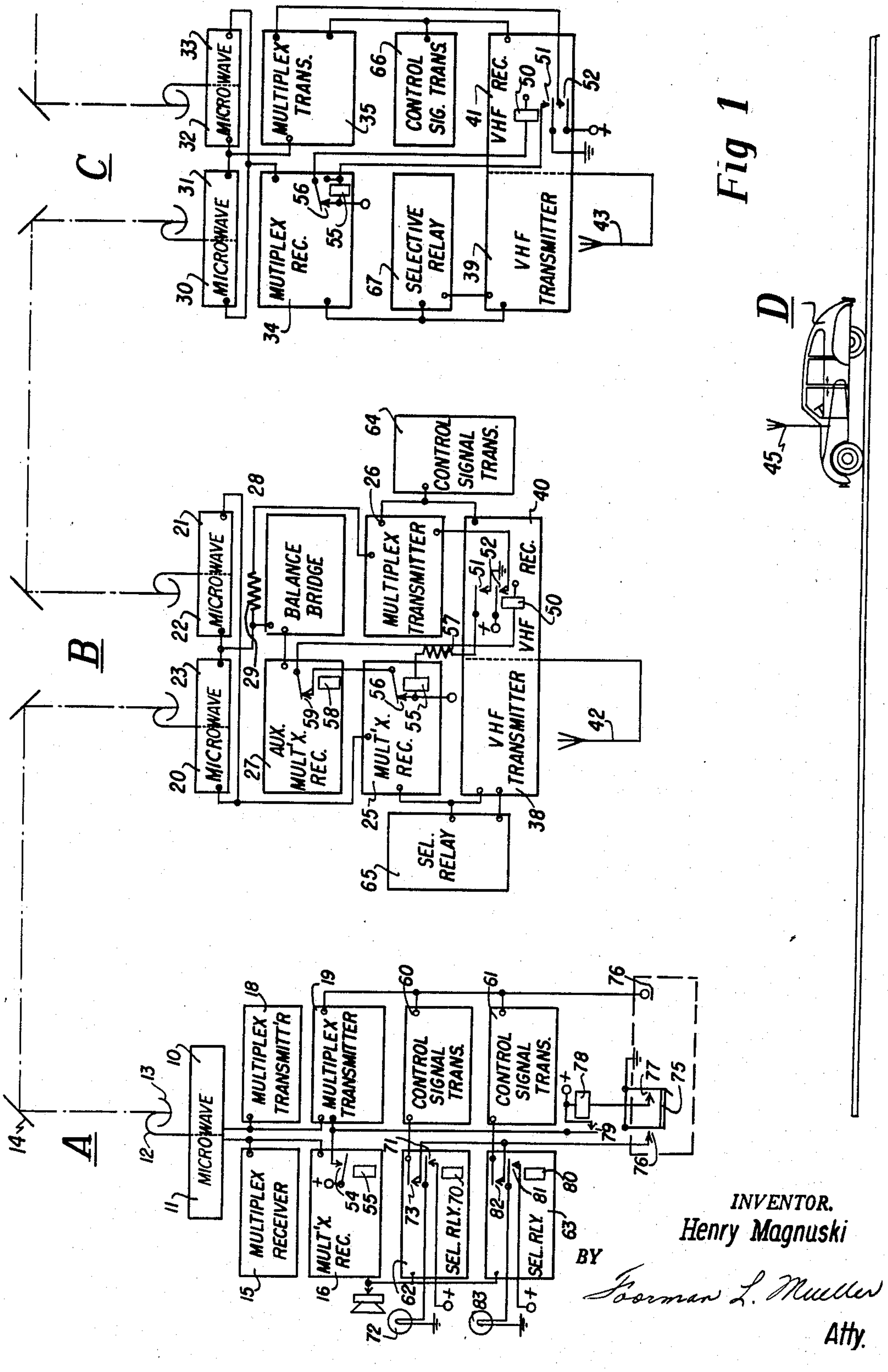

This invention relates generally to radio communication systems, and more particularly to systems including a plurality of fixed and mobile stations wherein communication is automatically established between a mobile station and the fixed station providing best communication therewith.

It is desirable in many applications to provide radio communication with a mobile unit which travels over a course which may extend for many miles. To accomplish this, it is necessary that the radio communciation system include a plurality of fixed stations positioned along the course since the range of communication between the mobile stations and the fixed stations is limited and it would not be possible to cover the entire area by a single fixed station. In such systems the fixed stations are connected together and to a central office by some communication channel which may be a wire line or a radio communication channel, such as a channel of a microwave relay system. It may be possible to position the fixed stations at points where communication is required for other purposes and still have the stations positioned so that the mobile units will always be within communication range of one or more stations, so that the facilities required are reduced to a minimum.

However, to provide good communication between the fixed stations and the mobile units, it is desirable to provide automatic selecting means which provides communication between the mobile unit and the particular fixed station with which best communication can be had at any particular time. It is, however, not desired to switch back and forth between a plurality of fixed stations rapidly resulting from slight changes in signal strength since this does not provide good communication. Further, it is desired that the equipment required be held to a minimum, and that the interconnections required between fixed stations be only a single communication channel.

It is therefore an object of the present invention to provide an improved radio communication system for use between mobile and fixed stations.

Another object of this invention is to provide a radio communication system wherein a fixed station receiving the best signal from a mobile station is automatically placed in communication therewith and other fixed stations are rendered inoperative.

A further object of this invention is to provide a system for communicating between a mobile station and a dispatcher through fixed stations located along the course traveled by the mobile station, wherein a single channel interconnecting the dispatcher and the fixed stations provides both communication therebetween and control of the system.

A still further object of this invention is to provide a system for communicating between fixed and mobile stations which automatically selects the fixed station providing best communication, and wherein preference is given to predetermined stations in the event that signals of like strength are received simultaneously by a plurality of fixed stations.

A feature of this invention is the provision of a communication system including a mobile station and spaced fixed stations wherein the communication is selectively established with the fixed stations through a control means including a unit at each fixed station which operates after a time delay varying inversely with the strength of the received signal.

Another feature of this invention is the provision of a receiving system including receivers spaced along a course over which a mobile station travels, wherein each receiver has a delayed squelch operated control rendered operative after a predetermined time which depends upon the strength of the received signal, with the various receivers being interconnected so that only the signal from the receiver, the control of which operates first, is used.

A further feature of this invention is the provision of a system over which a dispatcher can communicate with a mobile station through one of a plurality of spaced fixed stations, wherein a single channel provides communication between the dispatcher and the fixed stations, and also interlocking action so that only the fixed station providing best communication with the mobile station is connected into the system. A balance bridge arrangement is provided for giving preference to predetermined stations, when a plurality of stations receive signals of the same strength.

Still another feature of this invention is the provision of a memory device which retains information as to the fixed station which received the best signal from the mobile unit on the previous communication and which automatically provides transmission from the dispatcher to the mobile station over the transmitter at the said station only.

A still further feature of this invention is the provision of a system for automatically providing communication between a dispatcher and a mobile station through one of a plurality of fixed stations wherein the equipment at the terminal station and the fixed stations includes tone selective devices so that control of the system by the dispatcher as well as communication thereover is accomplished by the use of a single communication channel.

Figures 2, 3, 4:
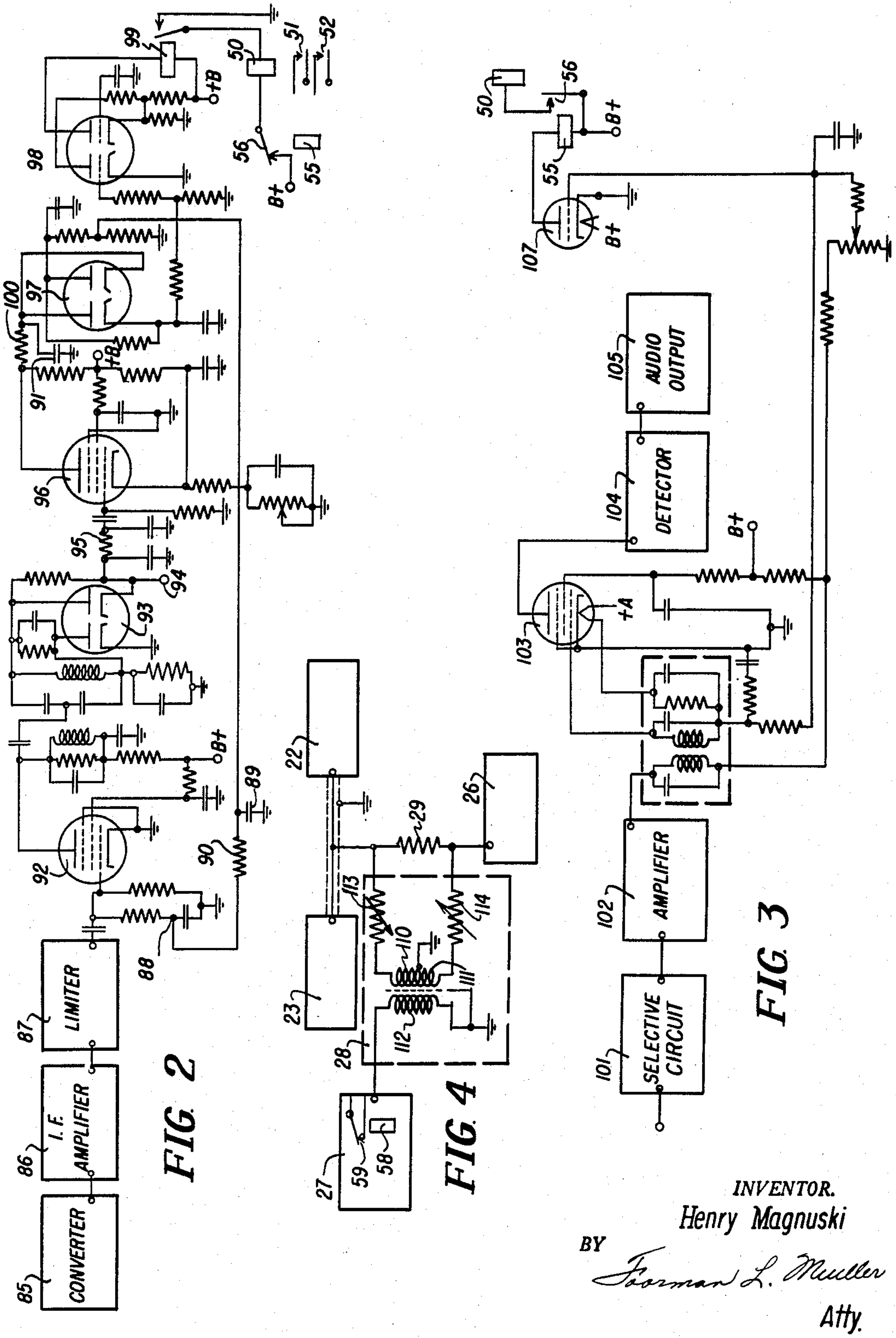

Further objects and features, and the attending advantages of the invention will be apparent from a consideration of the following description, when taken in connection with the accompanying drawings wherein:

Fig. 1 is a schematic diagram of the entire system with the various components being shown in block diagram form;

Fig. 2 is a circuit diagram of a fixed station V. H. F. receiver having delayed squelch control;

Fig. 3 is a circuit diagram of a multiplex receiver having squelch operation; and Fig. 4 illustrates the balance bridge arrangement for giving preference to one station.

In practicing the invention, there is provided a communicating system including a dispatcher station and a plurality of fixed stations spaced along a course over which mobile stations travel. The dispatcher station and fixed stations are interconnected by a single channel such as through one channel of a microwave system which may also provide other communication facilities along the said course. Communicaiton is provided between the mobile and the fixed stations by radio equipment provided at each of the stations. The radio communication receivers at the fixed stations all include delayed squelch circuits wherein a relay or other control is operated when a signal is received thereat, with the control being delayed by a time which varies inversely with the signal received. The received signal is transferred over the communication channel from the station, the control of which first operates, to the dispatcher or terminal station. Controls are provided between the dispatcher station and the fixed stations so that only one station, namely, the station at which the best signal is received is rendered operative, with the communication continuing with this fixed station for the duration of one transmission. When the next transmission starts, the system will again select the fixed station which has the best signal at that time. A selective system is provided so that the fixed station from which the communication is being received is identified at the dispatcher station and so that this fixed station is automatically selected for communication from the dispatcher to the mobile station. A balance bridge arrangement is provided so that in the event that signals of equal strength are received at a plurality of stations, and signals at the other stations are weaker, one of the stations receiving the best signal will be favored and only this station will be connected into the system.

Referring now to the drawings, in Fig. 1 there is illustrated the entire system which includes a plurality of fixed stations and one or more mobile stations. The fixed stations are illustrated as stations of a microwave system, and the communicating system in accordance with the invention utilizes one channel of the microwave system. It is to be pointed out, however, that the fixed stations may be interconnected by other suitable single channel communication systems, either radio or wire. Further, the double frequency modulation microwave system disclosed herein is only illustrative and systems using other types of modulation may be provided within the teachings of the invention. In Fig. 1 the station A is a terminal or dispatcher station and the system provides communication between this station and the mobile station. The station B is an intermediate station and in any system it may be desirable to provide a plurality of stations identical to station B. The station C may also be an intermediate station and is generally similar to station B, but is somewhat simplified as will be explained more fully. The mobile station which is illustrated as an automobile is designated station D.

At the station A there is provided a microwave transmitter 10 and receiver 11 which may both be connected to a common antenna 12. A parabolic reflector 13 and a 45° reflector 14 direct the signal from the antenna to the next station. The microwave system may provide a plurality of communication channels which are selected by multiplex or subcarrier receivers 15 and 16 connected to the microwave receiver 11. Signals may be provided for a plurality of channels by multiplex or subcarrier transmitters 18 and 19 which are connected to the microwave transmitter 10. It is obvious that a great number of multiplex or subcarrier transmitters and receivers may be used to provide various desired communication or control services. Only the multiplex receiver 16 and multiplex transmitter 19 are utilized in the communication system in accordance with the invenion as only a single communication channel is required for connecting the fixed stations of the system.

As station B is an intermediate or relay station, two sets of microwave transmitters and receivers are required for communicating in the two directions. The receiver 20 for the west section of the station is coupled to the transmitter 21 of the east section, and the receiver 22 of the east section is connected to the transmitter 23 of the west section. In the event that it is desired to communicate from the fixed station B only to the terminal station A in the present system, it will be necessary to provide only one receiver 25 connected to the microwave receiver 20 and one transmitter 26 connected to the microwave transmitter 23. An auxiliary receiver 27 is provided for a reason to be explained more in detail.

Station C is generally similar to station B and includes microwave receiver 30 and transmitter 31 in the west section and receiver 32 and transmitter 33 in the east section. Multiplex receiver 34 selects signals from the receiver 30 and multiplex transmitter 35 provides signals for the transmitter 31, to provide communication between the station C and the station A. The station C is the eastwardmost station in the system with which the mobile station will communicate and an auxiliary receiver is not required at this station.

Communication between the mobile station D and the fixed stations B and C may preferably be provided through very high frequency (V. H. F.) radio receiving equipment. The very high frequency transmitters 38 and 39 may be standard transmitters which are commercially available. The corresponding receivers 40 and 41 may also be receivers of standard construction having squelch circuits including relays or other means providing control. The receivers may be in accordance with Fig. 2 which will be described more in detail. The transmitter 38 and receiver 40 are connected to a common antenna 42 and the transmitter 39 and receiver 41 are similarly connected to a common antenna 43. Very high frequency transmitting and receiving equipment is also provided in the mobile vehicle D and is connected to the antenna 45 illustrated on this vehicle. The equipment in the vehicle D may be standard available equipment.

Considering now the operation of the system, the system illustrated may be used for providing communication between the mobile station D and the dispatcher at station A. When the party at mobile station D operates the transmitter at this station, the signal will be received by the V. H. F. receivers 40 and 41 at stations B and C. These receivers will both receive the signal, and it is assumed that the signal will be stronger at receiver 40 than at receiver 41. Each of the receivers includes a squelch operated control means or relay which operates with a time delay, with the time delay varying inversely with the signal strength. Since receiver 40 gets the strongest signal, the relay 50 of this station will operate first, closing contacts 51 and 52. The contacts 52 will apply B+ potential to the transmitter 26 so that the signals received by the receiver 40 will be applied to the microwave system by transmitter 26. The multiplex transmitter 26 operates on the same channel as the multiplex receiver 16 at station A so that the dispatcher at station A will receive the transmission.

The multiplex receiver 16 at station A, as well as the other multiplex receivers, also include control or relay means 55 which is normally energized and will be released when the signal is received at the receiver 16. This will provide B+ potential to the transmitter 19 to put this transmitter on the microwave system. The wave from this transmitter is received by the receiver 25 at station B, receiver 34 at station C, and similar receivers at any other stations which may be present in the system. This will open the squelch circuits of the multiplex or subcarrier receivers so that the normally closed relays 55 thereof will tend to open.

The relays 55 of the multiplex receivers 25 and 34 include contacts 56 in series with the squelch relays 50 of the V. H. F. receivers 40 and 41 so that when the multiplex receiver squelch is opened, the squelch controlled relay of the V. H. F. receiver at the same station will be disabled. However, the contacts 51 of the squelch relays 50 at the V. H. F. receivers provide connections through resistors 57 to the relays 55 of the multiplex receivers to hold these relays energized. It is therefore seen that the squelch relay 55 of the multiplex receiver at the station which receives the strongest signal from the mobile station D, and which station therefore provides transmission to the dispatcher, will remain energized and the multiplex transmitter at this station will remain operative. The squelch relays 55 of the multiplex receivers at the other stations will drop out causing the squelch relays 50 of the V. H. F. receivers to drop out so that the multiplex transmitters at these stations cannot operate.

When the dispatcher at station A desires to talk to the mobile station D, he can do so through the multiplex transmitter 19, the receiver 25 and the V. H. F. transmitter 38 at station B, or the receiver 34 and the V. H. F. transmitter 39 at station C. The station from which transmission is received by the dispatcher may be automatically selected by a control signal selecting system. This system includes different control signal transmitters 60 and 61 and selective relays 62 and 63 at station A, control signal transmitter 64 and selective relay 65 at station B and a different control signal transmitter 66 and selective relay 67 at station C. Each of the control signal transmitters provides a signal of a predetermined characteristic which is selected by one of the selective relays to cause operation of a transmitter connected to the relay.

When the multiplex transmitter 26 at station B is energized as previously described, the tone transmitter 64 sends a tone through the transmitter 26 which is received by the multiplex receiver 16 at station A and which operates tone relay 62, which is constructed to select the particular tone or tones. This causes the relay 70 to be energized, connecting contacts 71 which energize the indicator light 72, and also contacts 73 connected to the control signal transmitter 60. When the dispatcher wishes to communicate with the mobile station D, he merely presses the push-to-talk switch 75 associated with the micophone 76. The push-to-talk switch 75 includes contacts 76 which complete the circuit through contacts 73 to the control signal transmitter 60 so that this transmitter operates. The push-to-talk switch 75 also includes contacts 77 which energize relay 78 and closes the contacts 79 thereof for providing B+ to the multiplex transmitter 19 to render the same operative. Although the control signal from the transmitter 60 will be received by both the multiplex receiver 25 at station B and receiver 34 at station C, only the selective relay 65 will be sensitive to the signal assigned to transmitter 60 and will be actuated by this signal to energize the V. H. F. transmitter 38. That is, the V. H. F. transmitter 39 will not be energized since the selective relay 67 will not operate. Communication is thereby provided between the dispatcher and the mobile station D through the V. H. F. transmitter 38 at station B.

In the event that the signal from the mobile station D received at station C is of greater strength than that at station B, the relay 50 of the V. H. F. receiver 41 will operate first, and through the action of the squelch circuit of the multiplex receiver 16 at the terminal station A the other fixed stations would be locked out. In such case, the control signal transmitter 66 would be rendered operative and the signal therefrom will be selected by selective relay 63, so that the relay 80 thereof will be energized, closing contacts 81 and 82. The contacts 81 energize the indicator light 83, and the contacts 82 make connection to the tone relay 61. Therefore, when the push-to-talk switch 75 is operated, the control signal transmitter 61 will apply a signal to the transmitter 19 which, although received by both receiver 25 at station B and receiver 34 at station C, would operate only selective relay 67 at station C and only the V. H. F. transmitter 39 at station C would be operated. Communication is thereby established from the dispatcher at station A to the mobile station D through the fixed station C under these conditions.

The relays 70 and 80 responsive to the signals indentifying the fixed stations, and any additional relays for additional stations, may be connected in an interlocked holding circuits so that one relay is held energized until another relay is energized. This causes the relay which is actuated to remain actuated, thus constituting a simple memory circuit to facilitate the next communication. The holding and interlocking arrangements for the relays may be either electrical or mechanical, and the specific construction thereof does not form a part of the invention.

The holding arrangement may also be timed so that the memory is retained for only a limited time and, on the next transmission after the predetermined time, all of the relays may be actuated to operate all of the transmitters. A particular transmitter will then be selected when the mobile station answers back. This would cause the memory to be lost if sufficient time had elapsed for the mobile unit to change its position substantially so that there would be little likelihood of best communication still being obtained with the fixed station at which best communication was previously obtained.

As previously stated, the communication channel connecting the fixed stations may be of various different types. A double frequency modulation, frequency division, multiplex system has been found to be satisfactory for such use. In this system separate frequency modulated subcarriers are provided for each communication channel. The multiplex transmitters and receivers are therefore subcarrier transmitters and receivers. However, it is to be pointed out that the invention may be practiced in various different systems. Further, the control signals may be of various types and it has been found that frequency selective tones can be readily used in this system. It is to be pointed out, however, that other types of control signals may also be used within the intended scope of the invention.

Referring now to Fig. 2, this circuit illustrates a very high frequency receiver having a delay squelch operated relay. Such receivers include a converter 85, intermediate frequency amplifier 86, and a first limiter stage 87, which may be of standard construction and are shown in block diagram. A second limiter stage 92 is coupled to the first limiter stage and applies the limited signal to a discriminator 93 which produces an audio signal at the output terminal 94. This terminal may be connected to standard audio amplifier means and loud speakers or other reproducing means. The receiver includes a squelch circuit for providing a control operation when a signal is received, including a noise filter 95, noise amplifier 96, noise rectifier and differential combining system including the double diodes 97, amplifier stages 98 and the relay 99.

The squelch circuit of the receiver illustrated in Fig. 2 operates in accordance with Noble Patent 2,343,115 and will therefore not be described in detail. Noise selected by the filter 95 is amplified and rectified, and combined in a differential manner with the voltage from the grid of the limiter 92 derived at point 88. Relay 99 is normally energized to hold the contacts thereof open, with the contacts being closed when a signal is received. The contacts of this relay are connected in series with the relay 50 to provide ground thereto when a signal is received, with the relay 50 operating to close contacts 51 and 52 thereof when a potential is applied thereto through contacts 56 of relay 55. The action of the relay 99 is delayed by providing a large capacitor 89 and resistor 90 between the point 88 and the differential combining network and/or by providing a large condenser 91 and resistor 100 between the noise amplifier 96 and the noise rectifier 97. The use of these elements will cause the delay in relay operation to be inversely proportional to the strength of the signal received, as previously described.

The strength of the signal received will control the amplitude of the limiter voltage and therefore the stronger the signal, the faster the voltage will be built up across capacitor 89, and the diode 97 will operate quicker. It is to be pointed out that the system is not limited to the use of the voltage from the second limiter, but the voltages from the first limiter or from intermediate frequency amplifier stages may also be used. By using a plurality of stages the voltage across capacitor 89 may be built up faster, the connection thereto being provided by separate resistors (90) from each stage. By using voltages from a plurality of tubes, the system may be made to work over a greater range of signal strengths, since the second limiter may be saturated by relatively weak signals and the voltage will correspond to only a limited range of signal strengths. For simplicity of explanation, connection to only one limiter stage is shown.

In Fig. 3 there is shown the circuit diagram of multiplex receivers of the subcarrier type which may be used in the system of Fig. 1. This receiver includes a selective circuit 101 for selecting the desired channel, amplifier stage 102, limiter stage 103, discriminator stage 104, and audio output stage 105. The subcarrier receiver also includes a control stage 107 which may include a triode having a relay 55 in the output circuit thereof. This stage conducts when no signal is received and is rendered nonconducting when a signal is being received and a negative voltage is developed across the grid resistor of limiter tube 103. Therefore, the tube is normally conducting to hold the relay 55 energized so that the contact 56 thereof will be closed. These contacts 56 complete the circuit to relay 50 as has been previously described.

In Fig. 4 there is illustrated the circuit of the balance bridge 28 illustrated at station B in Fig. 1. The balance bridge connects the auxiliary receiver 27 to the coaxial line between microwave receiver 22 and transmitter 23, and also to the output of the subcarrier transmitter 26. Resistor 29 is bridged between these two connections. The bridge includes a pair of coil sections 110 and 111 which are inductively coupled to the shielded coil 112. The coil sections 110 and 111 are connected to receive the signal from the subcarrier transmitter 26 in a balanced manner so that no signal will be applied from the sections 110 and 111 to the coil 112 connected to the auxiliary receiver 27. This balance may be accurately established by the resistors 113 and 114 being variable. However, when a signal is transmitted on the subcarrier channel from the east and is received by the microwave receiver 22, this signal will be applied to the bridge in such manner that the bridge will be unbalanced and a signal will be developed in the coil 112 connected to the auxiliary receiver 27.

The auxiliary receiver 27 may be identical to the subcarrier receivers and includes a control device or relay 58 which operates when a signal is received. The received signal will cause the control device or relay 58 to be released, opening the contacts 59 thereof to break the circuit to the squelch relay 50 in the V. H. F. receiver 40 (Fig. 1) so that this relay is disabled. This bridge will be effective when stations B and C receive signals from the mobile unit of equal strength and therefore both subcarrier transmitters 26 and 35 are energized simultaneously. The action of the balance bridge will immediately force transmitter 26 off the microwave system leaving only one, namely 35, connected to it and thus preventing the interference which would result if two such transmitters would be permitted to operate over a single communication channel. By providing such a balanced bridge and auxiliary receiver in each station except the eastmost station, stations on the east will always be given preference over the stations to the west thereof.

The system disclosed has been found to have many advantages. First, only one communication channel, such as one microwave subcarrier channel, is necessary for interconnecting the various stations in the system. This is particularly advantageous in a microwave system as a smaller modulation load on the microwave is provided, and since this load is intermittent, it is desirable to hold the same to a minimum. Further, when communicating between the dispatcher and the mobile station, only one V. H. F. transmitter is put on the air instead of a plurality of transmitters. This has many advantages and is more in line with Federal Communication Commission rules. Another advantage is that the system uses standard components with very slight modification so that the cost of equipment is held low. The balance bridge required to prevent operation of more than one station, and the auxiliary receiver used with the bridge are relatively small items as compared to the overall system, and as compared to other known means for accomplishing such a result. As only the station initially receiving the strongest V. H. F. signal will be connected into the system during one transmission, there will be no interruption of the transmission caused by switching from one unit to another. At the beginning of the next transmission the station receiving the strongest signal is again selected but the objectional operation caused by switching back and forth is completely eliminated.

It is obvious that various embodiments of the invention may be made which will provide various different services suitable for particular applications. For example, the system with slight modifications could be made to provide communication between a pair of mobile vehicles through the dispatcher station. Because of the memory action of the relays 70 and 80, a signal from one mobile station may be transmitted to another mobile station through the fixed station nearest the other mobile station, which fixed station is indicated by the relays. The various interlocking circuits for the relays can also be replaced by mechanical interlocking systems if desired.

Although one embodiment of the invention has been disclosed which is illustrative thereof, it is obvious that various changes and modifications can be made therein without departing from the intended scope of the invention as defined in the appended claims.

I claim:

1. A communication system including in combination, a terminal station, a plurality of fixed stations spaced along a course, at least one mobile station movable generally along said course, each of said fixed and mobile stations including radio transmitting and receiving equipment for providing radio communication between said mobile station and said fixed stations, said receiving equipment at each of said fixed stations including control means constructed to operate after a time delay when a signal is received thereat from said mobile station, with the time required for said control means to operate varying inversely with the strength of the signal received, a single communication channel connecting said terminal station and said fixed stations, transmitting means at each fixed station controlled by said control means of said receiving equipment thereat for transmitting to said terminal station signals received from said mobile station, means at said terminal station operative when a signal is received thereat to transmit a signal to said fixed stations, and means at said fixed stations responsive to said signal from said terminal station for disabling said transmitting means of all said fixed stations except said fixed station at which said control means first operates.

2. A communication system including in combination, a terminal station, a plurality of fixed stations spaced along a course, a single communication channel connecting said terminal and fixed stations, at least one mobile station movable generally along said course, each of said fixed and mobile stations including radio transmitting and receiving equipment for providing radio communication between said mobile station and said fixed stations, said receiving equipment at each of said fixed stations including control means constructed to operate after a time delay when a signal is received thereby from said mobile station, with the time required of said control means to operate varying inversely with the strength of the signal received, each of said terminal and fixed stations including transmitting and receiving means for communicating between said terminal station and said fixed stations over said communication channel, said receiving means including control means operated when a signal is received thereby, said control means of said receiving equipment at each fixed station rendering said transmitting means thereat operative to transmit the signals received to said terminal station, said control means of said receiving means at each fixed station rendering said transmitting equipment thereat operative to transmit to said mobile station the signal received by said receiving means, means at said terminal station for rendering said transmitting means thereof operative to transmit a signal to said fixed stations when a signal is received at said terminal station, and means at said fixed stations interconnecting said control means of said receiving equipment and said control means of said receiving means for preventing operation of one of said control means after the other control means has operated, so that communication is provided between said mobile station and said terminal station only through said fixed station, the control means of said receiving equipment of which first operates.

3. A communication system including in combination, a terminal station, a plurality of fixed stations spaced along a course, a single communication channel connecting said terminal station and said fixed stations, at least one mobile station movable generally along said course, each of said fixed and mobile stations including radio transmitting and receiving equipment for providing radio communication between said mobile station and said fixed stations, said receiving equipment at each of said fixed stations including control means adapted to operate after a time delay when a signal is received thereby from said mobile station, with the time required for said control means to operate varying inversely with the strength of the signal received, each of said terminal and fixed stations including transmitting and receiving means for communicating between said terminal station and said fixed stations over said communication channel, selective signalling means coupled to said transmitting and receiving means at said terminal and fixed stations, said receiving means including relay means operated when a signal is received thereby, said control means of said receiving equipment at each station rendering said transmitting means thereof operative to transmit the received signals to said terminal station, means at said terminal station for rendering said transmitting means thereof operative to transmit a signal to said fixed station when a signal is received at said terminal station, and means at said fixed stations interconnecting said control means of said receiving squipment and said relay means of said receiving means for preventing operation of one of said means after the other is operated, so that communication is provided from said mobile station to said terminal station only through said one fixed station the control means of which first operates, said selective signalling means at said terminal station applying a signal to said transmitting means thereof for rendering only said transmitting equipment at said one fixed station operative so that communication is provided from said terminal station to said mobile station through said transmitting means at said terminal station and through said receiving means and said transmitting equipment at said one fixed station.

4. A communication system including in combination, a terminal station, a plurality of fixed stations spaced along a course, a single communication channel connecting said terminal station and said fixed stations, at least one mobile station movable generally along said course, each of said fixed and mobile stations including radio transmitting and receiving equipment for providing radio communication between said mobile station and said fixed stations, said receiving equipment at each of said fixed stations including control means constructed to operate after a time delay when a signal is received thereat from said mobile station, with the time required for said control means to operate varying inversely with the strength of the signal received, each of said terminal and fixed stations including transmitting and receiving means for communicating between said terminal station and said fixed stations over said communication channel, selective signalling means coupled to said transmitting and receiving means, said selective signalling means coupled to said receiving means at each fixed station causing said transmitting equipment thereat to operate, said receiving means including relay means operated when a signal is received thereby, said control means of said receiving equipment at each station rendering said transmitting means thereat operative to transmit the received signals to said terminal station, said selective signalling means coupled to said transmitting means at each fixed station selectively operating said selective signalling means coupled to said receiving means at said terminal station to indicate said fixed station from which the received signal is transmitted, means at said terminal station for rendering said transmitting means thereof operative to transmit a signal to said fixed station when a signal is received at said terminal station, and means at said fixed stations interconnecting said control means of said receiving equipment and said relay means of said receiving means for preventing operation of one after the other is operated, so that communication is provided between said mobile station and said terminal station only through said one fixed station, the control means of which first operates, said selective signalling means at said terminal station applying a signal to said transmitting means thereof for operating only said selective signalling means coupled to said receiving means at said one fixed station for operating said transmitting equipment thereof so that communication is provided from said terminal station through said transmitting means thereof and through said receiving means and said transmitting equipment at said one fixed station to said mobile station.

5. A communication system including in combination, a plurality of physically spaced fixed stations, a mobile station movable with respect to said fixed stations, each of said stations including radio transmitting and receiving equipment for providing radio communication said mobile station and said fixed stations, said equipment at each of said fixed stations including control means constructed to operate when a signal is received thereby from said mobile station, with the time required for said control means to operate varying inversely with the strength of the signal received, and means including a communication channel interconnecting said fixed stations and controlling the same so that communication is provided between said mobile station and said fixed station at which said control means first operates, said interconnecting means including an auxiliary receiver at one of said fixed stations and a balance bridge connecting the same to said channel, said auxiliary receiver including a control device rendered operative when a signal is applied to said auxiliary receiver from said channel for rendering said control means of said radio transmitting and receiving equipment at said one station inoperative in the event that first operation of said control means takes place simultaneously at said one station and at another one of said fixed stations so that communication is provided between said mobile station and said other fixed station.

6. A communication system including in combination, a plurality of fixed stations spaced along a course, means including a single communication channel connecting said fixed stations, at least one mobile station movable generally along said course, each of said fixed and mobile stations including radio transmitting and receiving equipment for providing radio communication between said mobile station and said fixed stations, said receiving equipment at each of said fixed stations including control means constructed to operate after a time delay when a signal is received thereby from said mobile station, with the time required for said control means to operate varying inversely with the strength of the signal received, each of said fixed stations including transmitting and receiving means coupled to said communication channel for communicating thereover, said receiving means including relay means operated when a signal is received thereby, said control means of said receiving equipment at each station rendering said transmitting means thereat operative to transmit the received signals, an auxiliary receiver at one of said fixed stations including a control device operated when a signal is received thereby, a balance bridge connected to said communication channel for applying a signal to said auxiliary receiver from said channel and for balancing out signals from said transmitting means at said one fixed station, and means at said fixed stations interconnecting said control means of said receiving equipment and said relay means of said receiving means for preventing operation of one after the other is operated, said control device being connected to said control means at said one station to disable the same in the event a signal is received at said one fixed station from another fixed station in response to operation of said control means at said other fixed station simultaneously with operation of said control means at said one fixed station, so that communication is provided between said mobile station and said terminal station only through said other fixed station.

7. A communication system including in combination, a terminal station, a plurality of fixed stations spaced along a course, a single communication channel connecting said terminal station and said fixed stations, at least one mobile station movable generally along said course, each of said fixed and mobile stations including radio transmitting and receiving equipment for providing radio communication between said mobile station and said fixed stations, said receiving equipment at each of said fixed stations including control means constructed to operate after a time delay when a signal is received thereby from said mobile station, with the time required for said control means to operate varying inversely with the strength of the signal received, each of said terminal and fixed stations including transmitting and receiving means for communicating between said terminal station and said fixed stations over said communication channel, said receiving means including relay means operated when a signal is received thereby, said control means of said receiving equipment at each station rendering said transmitting means thereat operative to transmit the received signals to said terminal station, said control means of said receiving means at said fixed station rendering said transmitting equipment thereat operative to transmit to said mobile station the signal received by said receiving means, means at said terminal station for rendering said transmitting means thereof operative when a signal is received thereby, an auxiliary receiver at one of said fixed stations including a control device operated when a signal is received thereby, a balance bridge connected to said communication channel for applying a signal to said auxiliary receiver from said channel and for balancing out signals from said transmitting means at said one fixed station, and means at said fixed stations interconnecting said control means of said receiving equipment and said relay means of said receiving means for preventing operation of one after the other is operated, said control device being connected to said control means at said one station to disable said control means in the event a signal is received by said receiving equipment at another station having the same strength as the signal received at said one station, so that communication is provided between said mobile station and said terminal station only through said other fixed station.

8. A communication system including in combination, a plurality of physically spaced fixed stations interconnected by a communication channel, a mobile station movable with respect to said fixed stations, each of said stations including radio transmitting and receiving equipment for providing radio communication between said mobile station and said fixed stations, said equipment at each of said fixed stations including control means responsive to a signal received thereat from said mobile station, said control means including a portion across which there is developed from the received signal a control signal varying with time at a rate depending upon the strength of the received signal, and means responsive to said control signal which operates when said signal reaches a predetermined value, whereby operation of said last named means is delayed by a time interval varying inversely with the strength of the received signal, and means interconnecting said fixed stations through the communication channel for rendering inoperative all said fixed stations except said station receiving the strongest signal and at which said control means first operates.

9. A communication system in accordance with claim 8 wherein said means interconnecting said fixed stations includes a portion of at least one of said fixed stations for rendering said one station inoperative in the event that first operation of said control means takes place simultaneously at said one station and at another station so that communication is provided between said mobile station and said other station.

10. A communication system including in combination, a plurality of physically spaced fixed stations interconnected by a communication channel, a mobile station movable with respect to said fixed stations, each of said stations including radio transmitting and receiving equipment for providing radio communication between said mobile station and said fixed stations, said equipment at each of said fixed stations including control means responsive to a signal received thereat from said mobile station, said control means including a condenser portion across which there is developed from the received signal a voltage which increases with time at a rate depending upon the strength of the received signal, and means responsive to said voltage developed across said condenser portion which operates when said voltage reaches a predetermined value, whereby operation of said last named means is delayed by a time interval varying inversely with the strength of the received signal, and means interconnecting said fixed stations through the communication channel for rendering inoperative all said fixed stations except said station receiving the strongest signal and at which said control means first operates.

References Cited in the file of this patent

UNITED STATES PATENTS

| | | |
|---|---|---|
| 2,393,291 | Clark, Jr. | Jan. 22, 1946 |
| 2,469,555 | Hitchcock | May 10, 1949 |
| 2,490,061 | Jensen et al. | Dec. 6, 1949 |
| 2,589,158 | Staples | Mar. 11, 1952 |
| 2,597,818 | Preston | May 20, 1952 |